INVENTOR.
JAMES B. CRAWLEY
BY Lancaster, Allwine + Rommel
ATTORNEYS.

Patented Feb. 23, 1954

2,669,986

UNITED STATES PATENT OFFICE 2,669,986

APPARATUS FOR ELECTRONICALLY LOCATING NERVE IRRITATIONS

James B. Crawley, Campbellsville, Ky.

Application February 1, 1950, Serial No. 141,746

2 Claims. (Cl. 128—2.1)

This invention relates to electrical diagnostic apparatus employed by the medical profession in connection with pathological conditions of the human body and more particularly to apparatus for electronically locating nerve irritations of the human body, such as those induced by pinching of the nerve fibers at the location where the nerves, which arise in the spinal column, emerge therefrom and pass out between the vertebrae.

Pinching of nerve fibers generally sets up inflammation, and an important object of the invention is to provide an apparatus constructed to accurately detect and locate such inflammation.

Another important object is to provide an electronic apparatus to ascertain the relative degree of inflammation.

Still another important object is to provide an assembly of parts so compact that the apparatus may be readily transported, stored in a small space, and the parts easily replaced.

Yet another important object is to provide an apparatus as described which comprises relatively few parts and none of them expensive nor difficult to secure for replacement, whereby the apparatus may be manufactured and serviced economically.

Another important object is to provide such an apparatus which incorporates sensitivity controls and calibrating means enabling the operator to make accurate checks as to the progress of treatment of nerve fiber irritation and inflammation.

A further important object is to provide an apparatus, the sensitivity and accuracy of which is substantially not impaired or affected by ambient room temperature surrounding the apparatus when in use.

A major object is to provide an apparatus as described which does not depend upon stray electrical fields for actuation but employs an input transformer to which is fed a voltage, this voltage then being fed to an electrode-carrying exploring instrument.

Another major object is to provide such an apparatus but including a special phase detector circuit employed for the indication of the location of nerve irritations.

Figure 1:
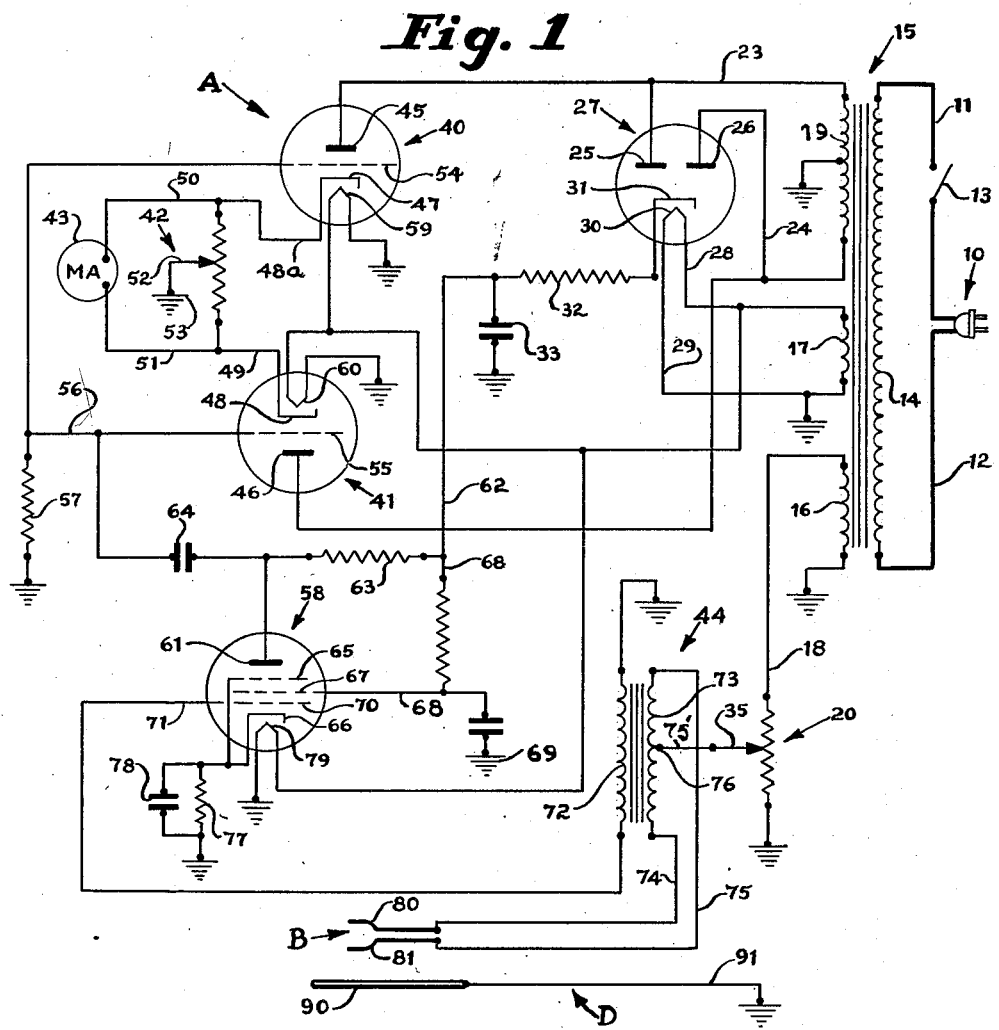

Other objects and advantages of the invention will be apparent during the course of the following detailed description of the invention, taken in connection with the accompanying drawing, forming a part of this disclosure, and in which drawing, Fig. 1 is a wiring diagram of the new apparatus and a ground employed therewith.

Figure 2:
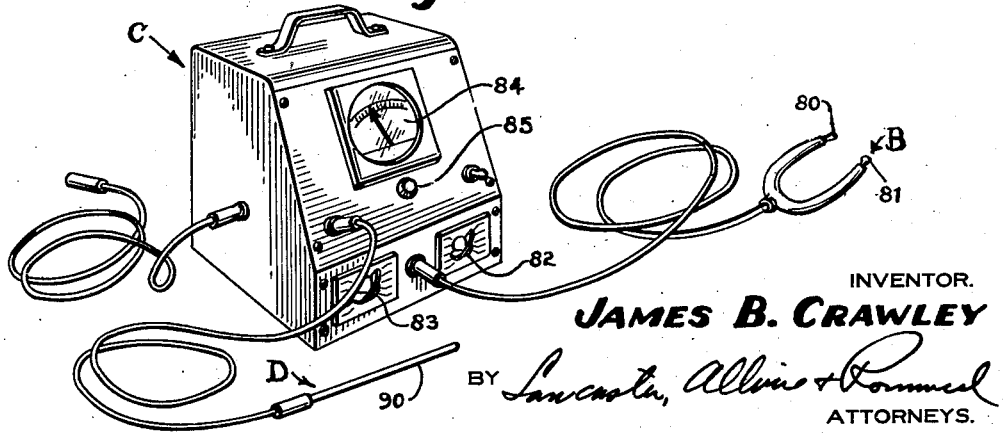

Fig. 2 is a front elevation of a housing which may be employed to contain portions of the electrical elements of Fig. 1 of the new apparatus.

In the drawing, wherein for the purpose of illustration is shown a preferred embodiment of the invention and wherein similar reference characters designate corresponding parts throughout the several views, the new diagnostic apparatus is designated as A with the exploring instrument as B, a housing C, and ground D.

The new diagnostic apparatus A includes conventional electric circuit means 10 for carrying a suitable alternating current, such as an 110-volt power supply, and this means is shown as conductors 11 and 12 with a conventional electric switch 13 interposed. These conductors are electrically connected with the primary winding 14 of an input transformer 15, to which transformer is fed a voltage for the exploring instrument B, whereby there is provided a more stable operation of the apparatus than would be possible than were the exploring instrument B actuated by stray electrical fields. It will be noted that there is provided a first grounded secondary winding 16, a second grounded secondary winding 17 and a third grounded secondary winding 19 for the transformer 15.

By means of the lead 18 connected with one end of the winding 16, signal voltage at the power supply frequency is fed to a suitable E. M. F. comparer 20, to be subsequently described.

From the opposite ends of the winding 19, leads 23 and 24 extend to the dual anodes 25 and 26 respectively of a suitable electron discharge device 27, shown as a double diode providing a full-wave rectifier. Leads 28 and 29 from the winding 17 carry the filament voltage to the filament 30 for indirect heating of the unipotential cathode 31. From the latter, a lead extends to a second electron discharge device to be described, with a resistance 32, as an 8,000-ohm resistor, interposed, and a suitable condenser, 33, as an 8 mfd. electrolytic condenser, is connected between ground and this last lead. The elements heretofore described constitute the power supply means of the new apparatus A.

The comparer 20 is preferably a conventional potentiometer with sensitivity control slider indicated diagrammatically at 35.

An important section of the new apparatus A is embodied in the assembly of electron discharge devices 40 and 41, E. M. F. comparer 42 and electrical measuring instrument 43, associated with a suitable transformer 44 and the exploring instrument B.

The electron discharge devices 40 and 41 are preferably alike but both of them (or their equivalent) is required. Each is shown as a triode, of like tube characteristics, with the anode 45 of the device 40 electrically connected with lead 23 and the anode 46 of the device 41 electrically connected with the lead 24. The cathodes 47 and 48 of the devices 40 and 41 respectively are electrically connected by leads 48a and 49 respectively to opposite ends of the comparer 42 which is preferably a 20,000-ohm potentiometer operatively connected, as by leads 50 and 51, with a suitable electrical measuring instrument 43. The slider or variable arm (sensitivity control) 52 of the comparer 42 is grounded as at 53. This measuring instrument is preferably a sensitive milliammeter as described in U. S. Patent 1,635,595, dated July 12, 1927, and entitled Electrical Measuring Instrument, and U. S. Patent 1,661,214, dated March 6, 1928, entitled Zero Corrector.

Furthermore, the devices 40 and 41 are provided with suitable grids 54 and 55, interconnected by lead 56 with grounded resistance 57 and with a suitable electron discharge device 58. The substantially like cathodes 47 and 48 of the devices 40 and 41 are provided with indirect heating by grounded filaments 59 and 60 which are electrically connected with the lead 28.

The electron discharge device 58 is preferably a pentode embodying an amplifier tube with the anode 61 thereof electrically connected with the grids 54 and 55 and, through the lead 56 and a lead 62, with the cathode 31, with conventional resistance 63 interposed in lead 56, and conventional paper condenser 64 interposed in lead 56. The grids 65 and 67 of the device 58 are, of course, electrically connected as follows: the suppressor grid 65 with the indirectly heated cathode 66 and the screen grid 67 with the lead 62, as by lead 68 (with suitable resistance interposed) and ground 69 provided. The third or control grid 70 is electrically connected, as by lead 71, with one end of the grounded secondary winding 72 of the input transformer 44. The primary winding 73 of the transformer 44 is electrically connected as by leads 74 and 75 to the electrodes of the exploring instrument B. From the sensitivity control slider 35, a lead 75' extends to the center tap 76 of the primary winding 73. This center tap is not directly grounded. There is provided a grounded resistor 77 electrically connected with the cathode 66 with condenser 78 across the resistor, and a grounded filament 79 for the cathode 66.

The voltage at lead 71 (and, in amplified form, at grids 54 and 55) depends for its polarity or phase with respect to the polarity or phase of the voltage across secondary winding 19 of transformer 15 and, also, for its amount, on the body impedance of the patient.

The exploring instrument B may be of any approved shape and size but includes two electrodes 80 and 81, constructed and arranged to contact the patient's body as at the back at opposite sides of the spine.

The elements heretofore described, except for the means 10, electrode-carrying portions of the leads 74 and 75 and exploring instrument B, may be conventionally housed within a suitable housing C with the face 84 of the electrical measuring instrument 43 exposed and suitable conventional means as operating handles provided, carried by and projecting from the housing C. One handle 85 may be conventionally operatively connected, as with the handle described in U. S. Patent 1,661,214 referred to above, to move the latter handle in order to manually adjust the instrument 43 to read zero normally, and handles 82 and 83 conventionally operatively connected with the sensitivity control sliders 35 and 42 respectively in order to manually operate the same.

The ground D may comprise a suitable electrode 90 constructed and arranged to efficiently contact the patient's body and may be a cylindrical one adapted to be held in one hand of the patient and electrically connected with a grounded conductor 91.

With the means 10 electrically connected with the power supply, the controls of the apparatus A adjusted, and the patient grasping the grounded electrode 90, the operator may apply the electrodes 80 and 81 as required to explore the patient's body. For example the exploring instrument may be positioned astride his spine with the electrodes in contact with his flesh.

An inflammation of nerve fibre, caused for example by a displaced vertebrae, will produce heat, and reduce the body impedance near the point of inflammation. When such a place is passed by the exploring instrument, the side of the spine that contains the inflamed nerve will present a lower impedance than the opposite side.

In operation, a voltage is applied to the grids 54 and 55 of devices 40 and 41, from the plate 61 of device 58, its phase (or polarity) being determined by the body impedance of the patient under test, and either device 40 or device 41 will draw more current than the other. When this occurs the cathode of the device drawing the most current will become more positive with respect to ground than the cathode of the other device, and the index or pointer of the instrument 43, connected between the cathodes 47 and 48, will indicate by moving to the left or right depending on which device 40 or 41 draws the most current. The cathode 66 of device 58 is returned to ground through the resistor 77. The drop of voltage caused by current flow through this resistor serves as bias for this device 58. The condenser 78 across this resistor 77 serves as a low impedance path for any alternating current (signal voltage) present in the cathode circuit.

Devices 40 and 41 have their grids fed from a common point, therefore any voltage at grids 54 and 55 must be the same with respect to amount and phase. Plates 45 and 46 are fed from a common transformer secondary winding 19 and, since the center tap is grounded, the amount of voltage at anode 45 will equal that at anode 46, but the voltages will be electrically 180° out of phase with each other or, stated otherwise, when anode 45 is positive plate (anode) 46 will be negative, and vice versa.

For example, if the slider 52 of the comparer 42 is set to the center, there will be 10,000 ohms from the cathode 47 to ground and also 10,000 ohms from the cathode 48 to ground. Assuming equal voltage on the anodes 45 and 46 and similar tube characteristics, there will be an equal electrical current flowing through each device 40 and 41, through each half of the comparer 42 and to ground. This would cause a voltage drop (current flowing through each half of the comparer 42) between each cathode 47 and 48 and ground. If the current drawn by each device 40 and 41 were the same and the resistance from cathode to ground of each the same, then the voltage drop from each cathode to ground would be the same. In other words, assuming equal conditions, there would be the same positive voltage from cathode 47 to ground as from cathode 48 to ground. Therefore, a voltmeter connected from cathode 47 to cathode 48 would give no indication. Actually this is the case. The electrical measuring instrument 43, preferably being a sensitive milliammeter which has a zero reading in the center of the scale, can indicate left or right depending on the polarity of the voltage applied to it. If, under static conditions, it does not read zero, the slider 52 of the comparer 42 is varied on one side of center to bring its reading to zero.

It is important to appreciate that, when a voltage is fed through the input transformer to the electrodes of the exploring instrument, a decidedly more stable operation of an apparatus embodying my invention can be expected than when an apparatus for electronically locating nerve irritations is actuated by stray electric fields, such as for nearby A.-C. lines. There is, as heretofore stated, no grounding of the center tap 76 of the transformer 44, but instead, the direct connection through lead 75 with the slider 35 of the comparer 20.

Furthermore, I do not depend upon indications of nerve pressure by such expedients as tilting of a trace on a cathode ray tube.

Various changes may be made to the form of the invention herein shown and described without departing from the spirit of the invention or scope of the claims.

What is claimed is:

1. In electrical diagnostic apparatus for electronically locating nerve irritations and the like of the human body, said apparatus including electron discharge means comprising two substantially like electron discharge devices, each having an electrically like anode, an electrically like cathode and an electrically like grid; an electrical measuring instrument; a first potentiometer having grounded sensitivity control means and a resistor; means electrically connecting said instrument and potentiometer, at the resistor thereof, with each cathode; a first transformer having a center tap to its primary winding; amplification means having a plurality of operating electrodes, including a cathode grounded through a resistance, an anode and a control grid; means operatively connecting said control grid with one end of the secondary winding of said transformer, the other end of said secondary winding being grounded; means operatively connecting the last-named anode with the grids of said electron discharge device, to apply a grid bias to each of the last-named grids; and electric exploring instrument provided with two electrodes; means electrically connecting one electrode with one end of said primary winding; means electrically connecting the other electrode with the other end of said primary winding; power supply means for said electron discharge devices, including a second input transformer; a second potentiometer including sensitivity control means and a grounded resistor; means electrically connecting said second resistor with a secondary winding of said second transformer; and means to feed a voltage to said first transformer, including an electrical connection between said second sensitivity control means and said primary winding of said first transformer at said center tap.

2. In electrical diagnostic apparatus for electronically locating nerve irritations and the like of the human body, said apparatus including electron discharge means comprising two substantially like electron discharge devices, each having an electrically like anode, an electrically like cathode and an electrically like grid; an electrical measuring instrument; a first potentiometer having grounded sensitivity control means and a resistor; means electrically connecting said instrument and potentiometer, at the resistor thereof, with each cathode; transformer means to which is fed a voltage, said transformer means comprising a first transformer having a center tap to its primary winding; amplification means having a plurality of operating electrodes, including a cathode grounded through a resistance, an anode and a control grid; means operatively connecting said control grid with one end of the secondary winding of said transformer, the other end of said secondary winding being grounded; means operatively connecting the last-named anode with the grids of said electron discharge device, to apply a grid bias to each of the last-named grids; an electric exploring instrument provided with two electrodes; means electrically connecting one electrode with one end of said primary winding; means electrically connecting the other electrode with the other end of said primary winding; power supply means for said electron discharge devices, including a second input transformer rectifying means to supply positive voltage to said amplification means, including a full-wave rectifier with said rectifier having a pair of anodes; means electrically operatively connecting said pair of anodes with one of the secondary windings of said last-named transformer; a second potentiometer including a sensitivity control means and a grounded resistor; means electrically connecting said second-named resistor with another of the secondary windings of said second transformer; and means to feed a voltage to said first transformer including an electrical connection between said second-named sensitivity control means and said primary winding of said first transformer at said center tap.

JAMES B. CRAWLEY.

References Cited in the file of this patent
UNITED STATES PATENTS

| Number | Name | Date |
| --- | --- | --- |
| 1,648,899 | Hayman | Nov. 15, 1927 |
| 2,429,968 | Stanphill | Oct. 28, 1947 |
| 2,498,882 | Fizzelle et al. | Feb. 28, 1950 |